June 21, 1932.  R. B. FAGEOL  1,863,974
ROAD VEHICLE
Filed Oct. 22, 1927   5 Sheets-Sheet 4
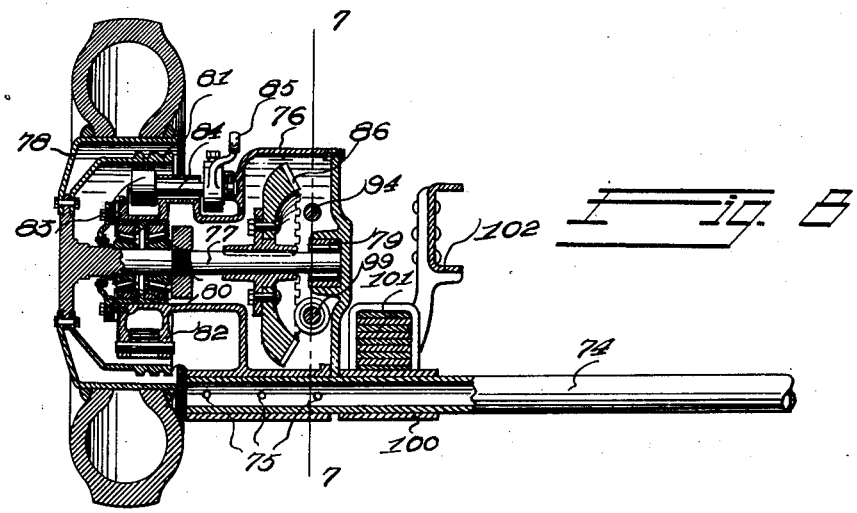
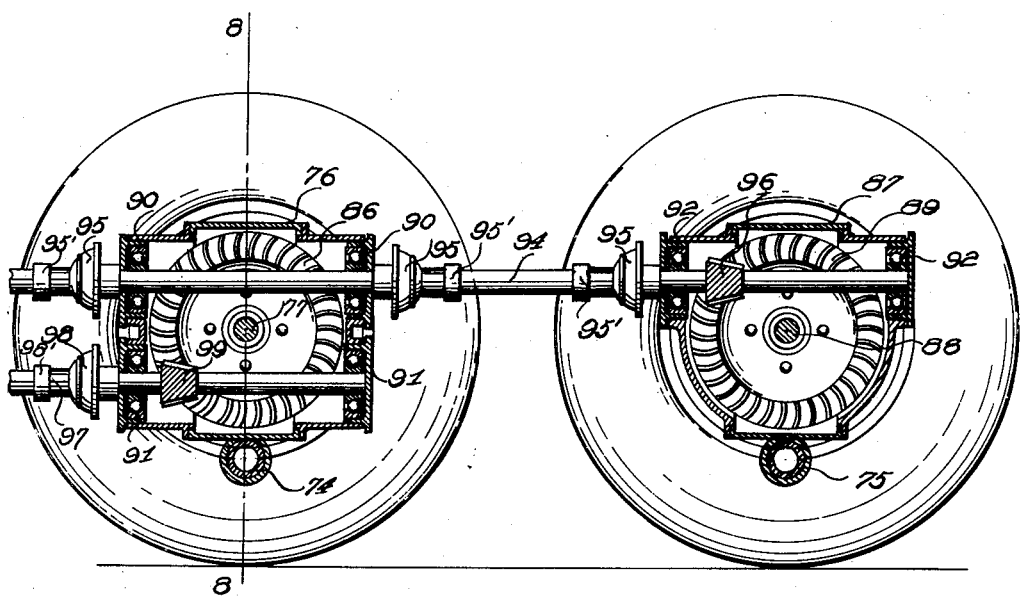
Inventor
Rollie B. Fageol
By William A. Strauch
Attorney

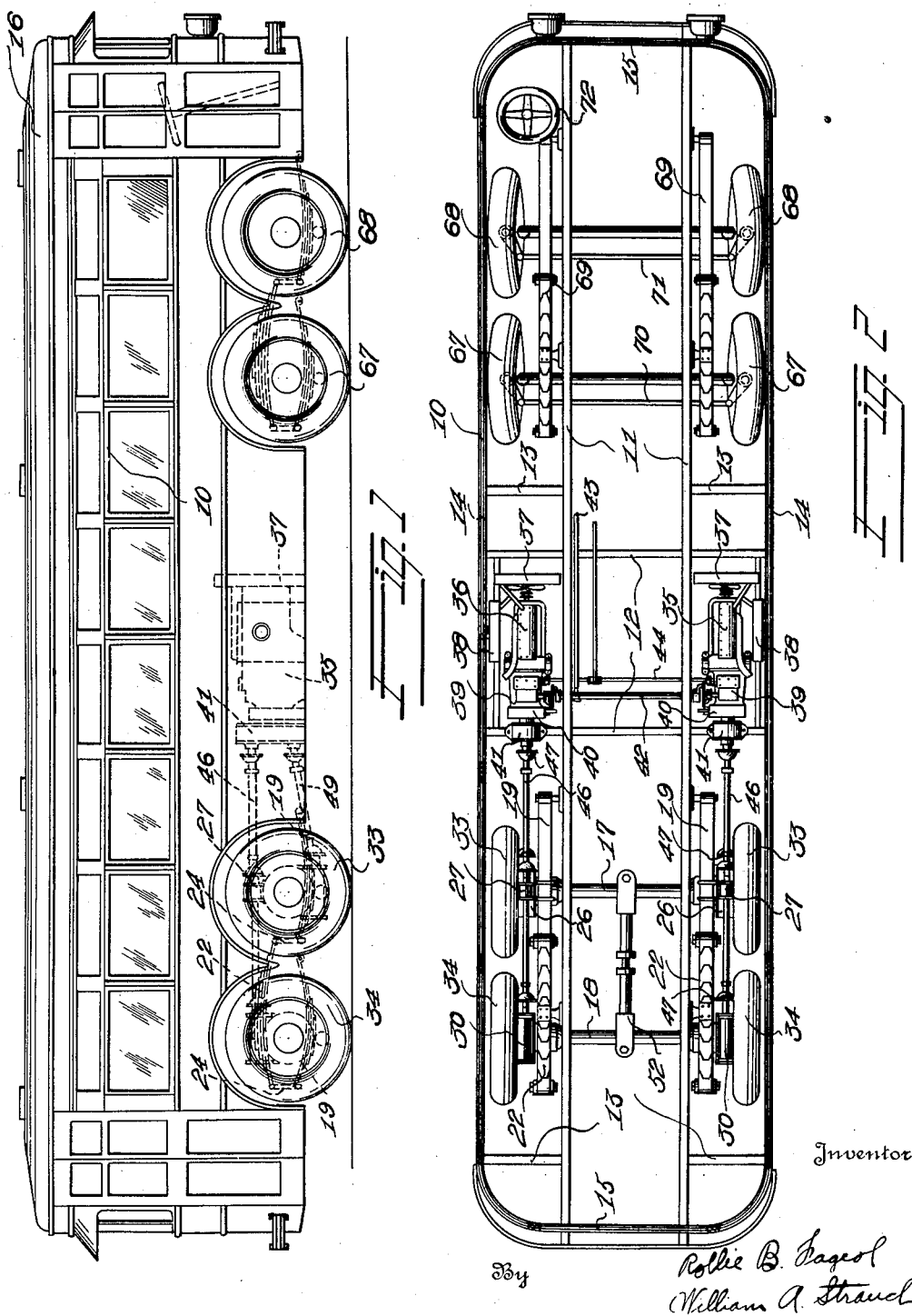

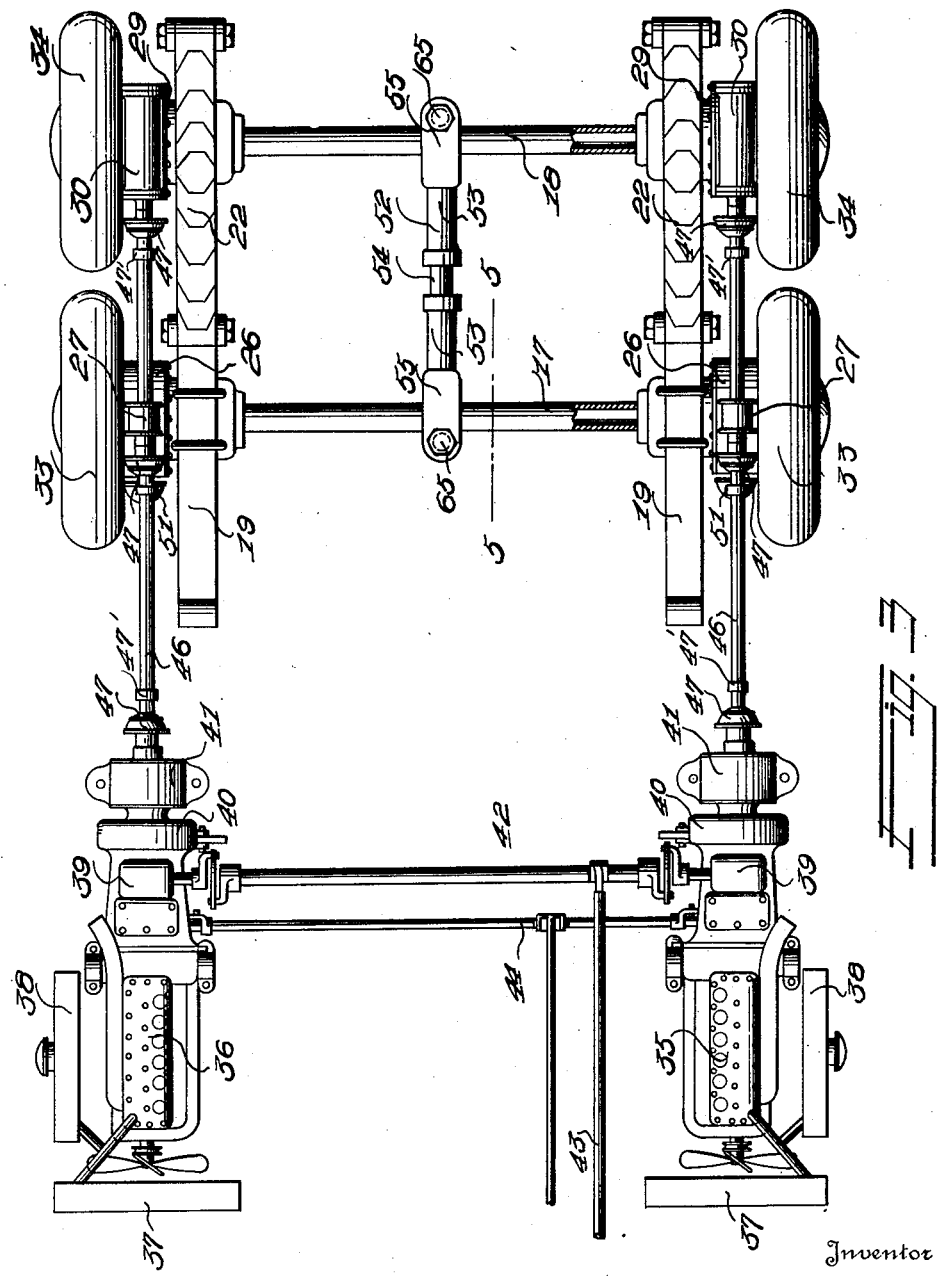

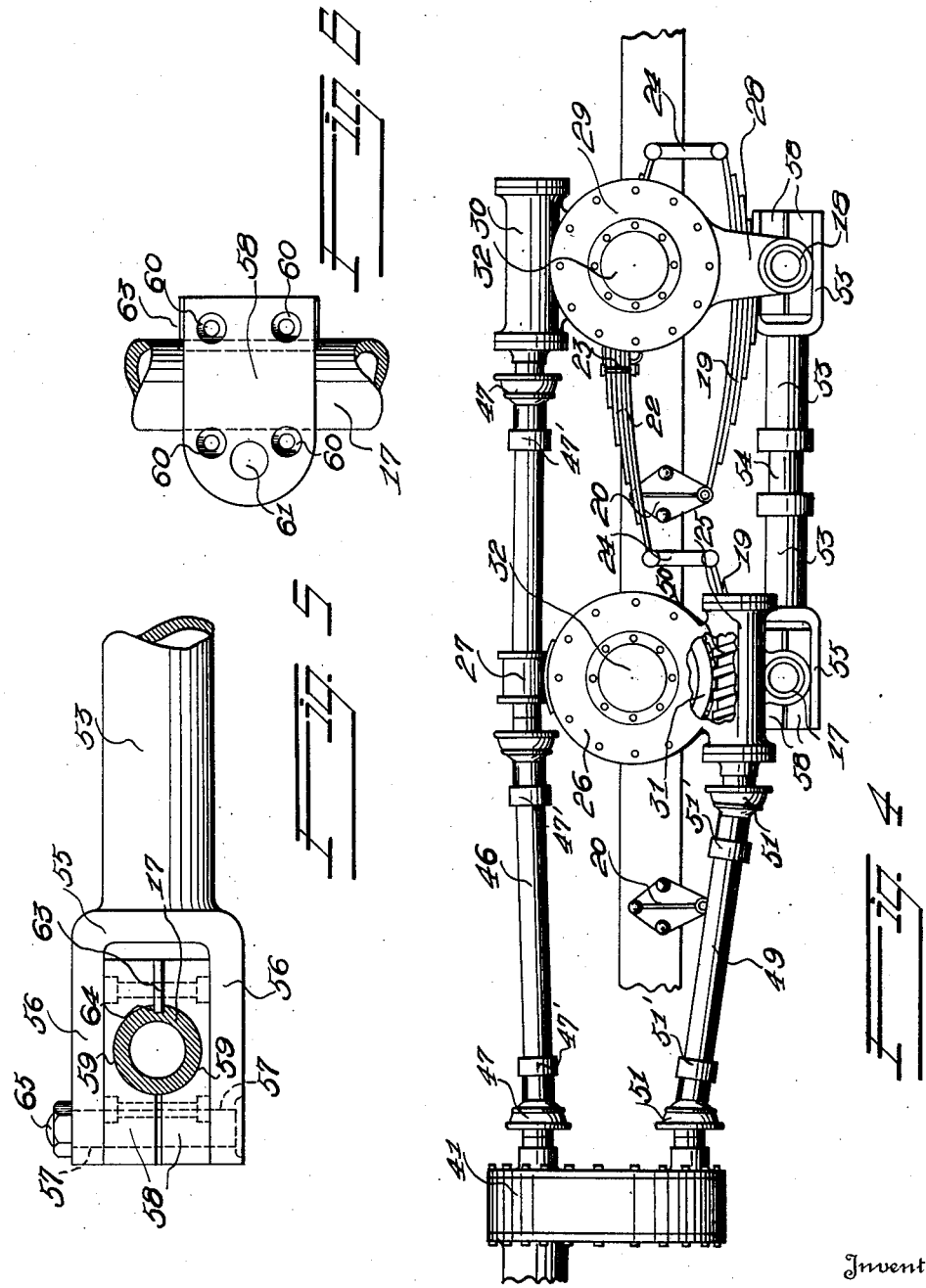

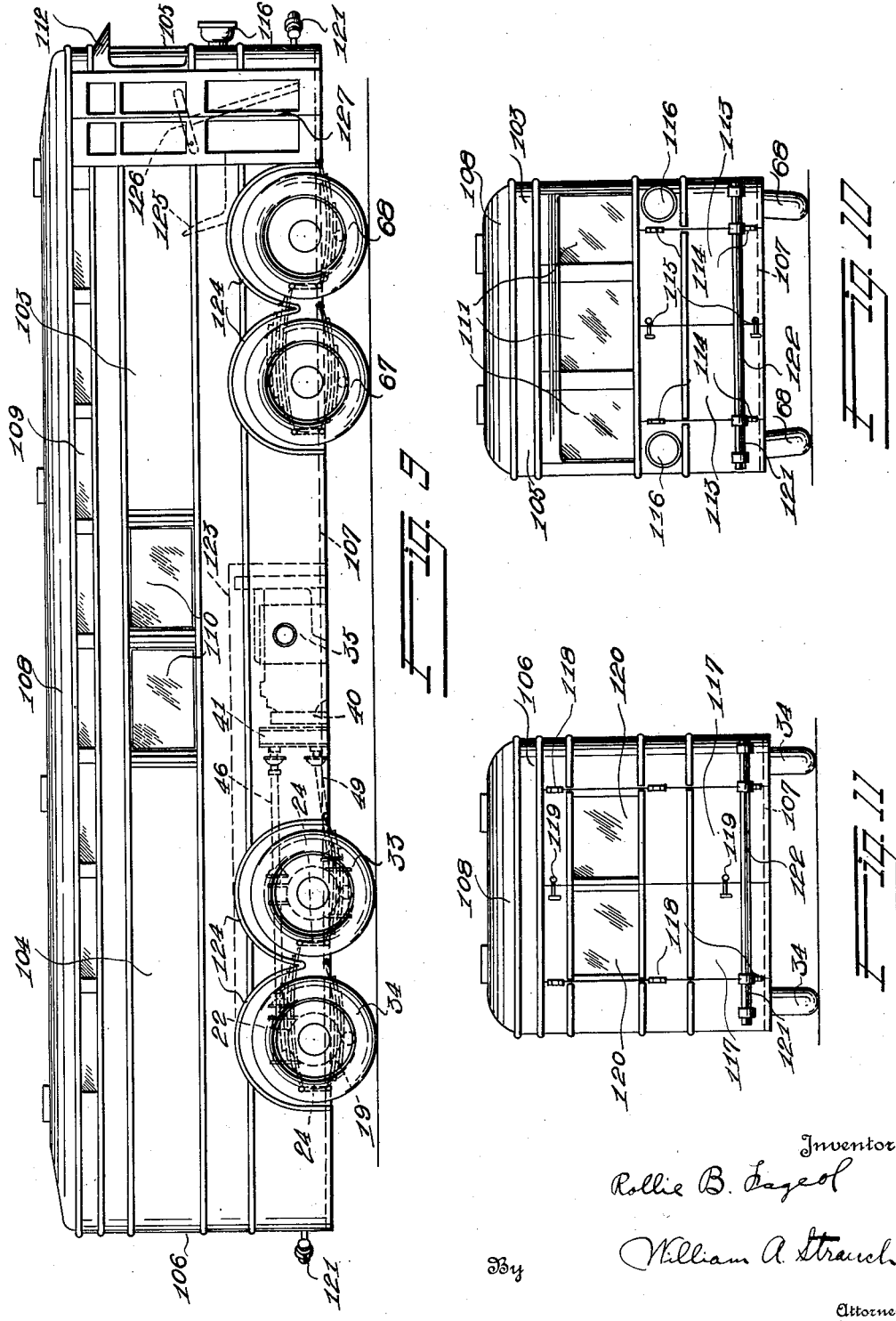

Patented June 21, 1932

1,863,974

UNITED STATES PATENT OFFICE

ROLLIE B. FAGEOL, OF LOS ANGELES, CALIFORNIA, ASSIGNOR TO EIGHT-WHEEL MOTOR VEHICLE COMPANY, A CORPORATION OF CALIFORNIA

ROAD VEHICLE

Application filed October 22, 1927. Serial No. 228,046.

A primary object of this invention is to provide a road vehicle having a load carrying body of maximum internal dimensions for a given wheel base and width, in which the power generating mechanism is so located with respect to the axles that the weight thereof and the weight of the body are substantially equally distributed to the end that the total dead weight is substantially evenly divided between the axles, and to provide a body that is substantially symmetrical with respect to a transverse plane passing centrally through the body, such a body contributing to the even distribution of the dead load on the several axles.

This invention further relates to the construction of an automotive road vehicle embodying a plurality of pairs of driven wheels and having self-contained power generating sources, such as internal combustion engines with transmission and driving mechanism connected therewith and adapted to transmit the power of the power generating sources to said wheels. The invention is specially adapted to automobile busses of the type in which passenger or load carrying capacity is of prime importance.

A further object of this invention is the provision of driving mechanism for multi-wheeled automotive road vehicles of the type including more than two driven wheels wherein the frame and body is of a unitary construction adapted to provide a maximum passenger or load carrying capacity and wherein the power generating sources and driving mechanism associated therewith are symmetrically arranged and housed within the body to thus provide an arrangement whereby an effective driving of the plurality of wheels is accomplished while the parts are maintained in a much more balanced relation than in the usual automotive vehicle and wherein the stresses due to unbalanced mounting of heavy parts are largely reduced.

A still further object of this invention is the provision of driving mechanism for automotive vehicles of the type having multi-drive wheels and wherein the driving mechanism is of such construction that the drive wheels on one side of the vehicle are driven independently of the wheels on the other side thereof.

A still further object of this invention is the provision of driving mechanism for automotive vehicles provided with tandem drive wheels on each side of the vehicle whereby the wheels on either side of the vehicle are driven independently of those on the opposite side of the vehicle, but wherein the drive wheels on the same side of the vehicle are differentially driven.

A still further object of this invention is the provision of a torque arrangement adapted to be securely and expeditiously attached to or disconnected from the tubular axles.

A further object of the invention is to provide a torque resisting connection between the axles that is of an extremely simple construction and has an effective length greater than the distance between the axle centers and which is thoroughly effective to resist the torque without subjecting the bolts by which it is connected to the axles to substantial twisting stresses.

A still further object of the invention is to provide a drive arrangement in which the wheels on the same side of the vehicle are driven by separate differentially driven drive shafts and in which hypoid gears are employed to operatively connect said shafts with the wheels to the end that said shafts may be located between horizontal tangential planes that bound the gears that drive the wheels so that angularity of the drive shafts may be reduced to a minimum and so that the overall height of the driving mechanism may be kept as small as possible to secure the compactness essential to the procurement of a low center of gravity for the vehicle.

A still further object of this invention is the provision of a novel truck body construction of maximum load carrying capacity having the power generating and propelling means associated therewith so arranged within the body that the weight thereof and the weight of the body are substantially equally distributed throughout the length of the body.

Further objects of the invention will appear as the description proceeds with reference to the accompanying drawings, in which—

Figure 1 is a side elevational view of an automotive bus disclosing the application of my invention thereto.

Figure 2 is a longitudinal sectional view disclosing a full line plan of the steering and driving wheels and my improved driving construction.

Figure 3 is a top plan view of the tandem drive wheels, motors and power transmitting mechanism.

Figure 4 is a side elevational view of the rear portion of the structure disclosed in Figure 3 with the drive wheels removed.

Figure 5 is a view taken on line 5—5 of Figure 3 shown on an enlarged scale.

Figure 6 is a partial top plan view of one of the drop crank tube axles with the cooperating block members thereon prior to mounting the torque tube.

Figure 7 is a longitudinal sectional view corresponding to the plane of line 7—7 Figure 8 depicting a modified construction.

Figure 8 is a transverse sectional view taken on line 8—8 of Figure 7.

Figure 9 is a view in side elevation of a novel truck body forming part of my invention.

Figure 10 is a front end elevation, and

Figure 11 is a rear end elevation of the construction illustrated in Figure 9.

Referring to the drawings by reference characters in which like characters designate like parts, 10 designates as a whole an automotive bus or vehicle body construction comprising a pair of parallel longitudinally extending channel bars 11 and transversely extending bars 12 adapted to support the power generating and transmission mechanism as shown in Figure 2 and other transversely extending bars 13 adapted to form a support for the floor of the vehicle and the side and end walls thereof, which side and end walls are designated by the reference characters 14 and 15 respectively and which support a suitable roof 16.

The body as particularly illustrated in Figure 1 is adapted to have the wheels, power generating and transmission mechanism associated therewith in such relation that the seating capacity is a maximum, the power generating units being suitably housed within seats facing each other transversely of the body.

Adjacent the rear end of the vehicle body are a pair of drop crank tubular axles or stub axles 17 and 18 which are resiliently suspended from the channel bars 11 by leaf spring constructions each of which comprises a bowed leaf spring 19 journaled on the respective stub shaft, the forward ends of which springs are longer than the rear ends thereof and which are pivotally mounted on brackets 20 supported by the bars 11, each pair of leaf springs 19 on the same side of the vehicle having their shorter ends flexibly and yieldingly interconnected by means of an equalizing leaf spring 22 suitably journaled on a bracket 23 and having its ends in spaced relation to said shorter ends and flexibly connected thereto by means of the links 24.

The axle 17 at each end thereof supports a worm housing 25 which housings merge into worm gear wheel housings 26. The housings 26 support at the tops thereof self alining ball bearing shaft supports 27. The axle 18 at each end thereof supports through the medium of brackets 28 worm gear wheel housings 29 which merge into worm housings 30.

Suitably journaled within the housings 26 and 29 are worm gear wheels 31 provided with shafts 32 to which the drive wheels 33 and 34 are detachably secured. Suitably supported within the body 10 adjacent the side walls thereof and substantially midway the length thereof are motors 35 and 36 which are preferably of the internal combustion type and are preferably located under side seats in order not to interfere with the carrying capacity of the vehicle.

Each motor is provided with a radiator 37 and tank 38. Connected with each motor directly rearwardly thereof is a suitable transmission or gear set 39 and immediately rearward of the gear set is a propeller shaft brake 40 and adjacent the brake is a double drive shaft differential 41 adapted to be mounted on the base frame of the body 10.

The opposite transmissions or gear sets are adapted to be actuated by a suitable gear shift rod 42 and lever 43 and a suitable clutch control device 44 is provided to engage and disengage the clutch. Extending from each differential 41 to the corresponding worm housing 30, is a sectional drive shaft 46 which passes over the housing 26 and through the support 27 mounted thereon and at its rear end carries a worm adapted to mesh with the worm gear wheel 31.

Each shaft 46 is provided with a plurality of flexible joints 47 and telescopic joints 47′ which as shown in Figure 4 are located adjacent the differential, the shaft support and the worm housing. Extending from each differential 41 to the corresponding worm housing 25 vertically beneath the shaft 46 is a drive shaft 49 which at its rear end carries a worm 50 adapted to mesh with the corresponding worm gear wheel 31. Each shaft 49 is provided with flexible joints 51 and telescopic joints 51′ located adjacent the differential and worm housing.

The manner in which the drive shafts 46 and 49 are connected with the differential 41 causes the two shafts to rotate in opposite directions but the drive wheels are caused to rotate in the same direction by mounting the drive shafts as shown in Figure 4 wherein shaft 46 as mounted above its corresponding drive wheel shaft 32 and shaft 49 is mounted below its corresponding drive wheel shaft 32. This manner of mounting the drive shafts relative to the drive wheel shafts produces a vertical straight line drive.

It will thus be seen that the motor 35 drives only the two drive wheels on the same side of the vehicle while the motor 36 similarly drives only the two drive wheels on the other side of the vehicle and consequently there is no need of a differential between the alined drive wheels on opposite sides of the vehicle as the two oppositely located motors will automatically control the turning movements of the vehicle and the frame mounted differential 41 on each side of the vehicle will automatically permit differential movements of the wheels on the same side of the vehicle upon turning the vehicle.

As journaled connections are provided between the axles 17 and 18 and the springs 19 and 19 provision is made to prevent rotation of the axles about their longitudinal centers and to compensate for the driving and braking reactions. This compensation is preferably effected independently of the body and supporting springs in order to permit flexibility of motion of the axles with relation to the body under road conditions. Accordingly a torque resisting member 52 is provided consisting of a pair of socket members 53 and a cylindrical rod 54 having one end thereof rigidly secured in one socket member 53 and the other end slidably and rotatably engaging the other socket member.

The torque resisting member 52 is adapted to be detachably secured to the axles 17 and 18 by providing the opposite ends of the socket members with bifurcated heads 55 providing spaced tongues 56 containing alined apertures 57. Positioned on each axle and adapted to be receiving between the tongues 56 of the heads 55 is a pair of oppositely disposed blocks 58 each provided with a substantially semi-cylindrical axle engaging recess 59 and vertically alined countersunk opening 60. The blocks are further provided with vertically alined openings 61 adapted to register with the openings 57 in the tongues 56.

The torque resisting member is connected with the axles by securing the blocks 58 to the axles substantially centrally the ends thereof by means of securing members extending through the alined openings 60 whereupon a key 63 is driven in between the blocks 58 and engaged in a keyway 64 in the axle to prevent rotation of the assembled blocks. Having thus been assembled on the axles the tongues 56 are positioned in engagement with the opposite faces of the blocks and pivotally connected thereto by means of a suitable bolt 65 extending through the alined openings 57 and 61, which connection prevents a relative turning of the axles and torque resisting member about the longitudinal axes of the axles but permits the ends of the torque resisting member to pivot about the bolts 65 as pivots.

The forward end of the vehicle is provided with dirigible wheels 67 and 68 which are resiliently supported by means of suitable springs 69 similar in construction to those above described in connection with the drive wheels, the wheels 67 and 68 being connected by rods 70 and 71 adapted to be connected with the steering wheel 72 in well known manner.

While four dirigible wheels are shown it is apparent that only two such wheels could be employed without in any way impairing the operation of the drive arrangement.

In Figures 7 and 8 is disclosed a modification of the means for importing rotation to the drive wheels. In this form of the invention a pair of drop crank tubular axles 74 and 75 are provided, which are adapted to be connected intermediate their ends by a torque resisting member as above described in relation to the axles 17 and 18.

The axle 74 at each end thereof is rigidly connected by means of suitable connecting means 75′ to a housing 76. Supported within the housing is a shaft 77 to the outer end of which the drive wheel 78 is detachably connected. The shaft 77 at the inner end thereof is mounted in a roller bearing 79 and adjacent the outer end thereof is supported in oppositely positioned roller bearings 80. Detachably secured to the wheel 78 is a brake drum 81 and carried by the housing 76 is a brake mechanism 82 comprising a pair of brake shoes adapted to be brought into engagement with the brake drum by means of the cam 83 which is actuated by means of the shaft 84 provided with brake actuating arm 85. Said arm may be moved to apply the brakes in any approved manner. Suitably keyed on the shaft 77 is a hypoid gear 86. The axle 75 at each end thereof similarly supports a housing 87 which is provided with the bearings and brake mechanism as above set forth in connection with the housing 76. Each housing 87 is provided with a shaft 88 to which is suitably keyed a hypoid gear 89.

As shown in Figure 7, the housing 76 is provided with a pair of upper longitudinally alined bearings 90 and a pair of lower longitudinally alined bearings 91 and the housing 87 is provided with a pair of longitudinally alined bearings 92 which are longitudinally alined with the bearings 90 in the housing 76.

In this form of the invention the motors, transmissions and differentials are mounted as disclosed in connection with the first form of the invention and extending rearwardly from the differential on each side of the vehicle is a sectional through drive shaft 94 which extends through the housings 76 and 87 and is journaled for rotation in the longitudinally alined bearings 90 and 92. The shaft 94 is provided with flexible joints 95 and telescopic joints 95' which as shown in Figure 7 are arranged adjacent the bearings 90 and 92, permitting the axles to have the movements permitted by their spring connections. Each through drive shaft 94 adjacent the rear end thereof and within the housing 87 has secured thereto a hypoid gear 96 adapted to mesh with the large hypoid gear 89 to thus drive the rear drive wheels.

Extending rearwardly from the differential on each side of the vehicle vertically beneath the shaft 94 is a drive shaft 97 which is journaled in the bearings 91 in housing 76 and is provided with a flexible joint 98 and telescopic joint 98' adjacent the housing 76.

The shaft 97 has secured thereto within the housing 76 a hypoid gear 99 adapted to mesh with the larger hypoid gear 86. It will be observed that by the construction just described, the shafts 94 and 97 extend in a substantially straight line, and that said shafts are arranged well within the limits of the housings for the gears 86. Losses of power due to the angularity of the drive shafts are avoided by the straight line arrangement of the shafts, while the overall vertical dimensions of the housing necessary to enclose the wheel driving mechanism is reduced to a minimum. A lighter construction, that does not unduly project into the interior of the body while affording ample ground clearance, accordingly results.

The axles 74 and 75 at opposite ends thereof adjacent the gear housings are provided with bearing members 100 to which the leaf springs 101 are secured for resiliently suspending the axles 74 and 75 from the frame 102 of the vehicle.

My invention also contemplates a novel truck body construction 103 adapted to be supported and driven by the means above described in detail and to which like reference characters have been applied. The truck body 103 overhangs the wheels 33, 34, 67 and 68 both longitudinally and transversely as is clearly illustrated in Figures 9, 10 and 11 in order to provide a body of maximum carrying capacity.

The body 103 is a closed structure and comprises the sides 104, front end 105, rear end 106, floor 107, and roof 108, built up on a frame work of the type heretofore described. The body being designed to carry merchandise, it is not essential that much light be admitted to the interior but some light is desirable particularly when the truck is used for the transportation of mail and like matter, or where it is desired to station one or more persons in the body to sort and arrange the mail, packages, or like matter.

Accordingly the sides 104 of the body are each provided with a longitudinal series of windows 109 adjacent the roof 108 to admit light to the interior of the body and these windows may be hinged at one edge thereof and adapted to be swung open, preferably inwardly, for the purpose of ventilation.

The sides 104 may each be further provided with two or more larger windows 110 substantially midway of the length of the body for the purpose of admitting light to the interior thereof. More or less windows may be supplied depending upon the character of merchandise adapted to be carried by the truck.

The front end 105 is provided with a plurality of windows 111 to offer unobstructed vision to the operator, a suitable visor 112 being arranged above and in proximity to the windows 111. The front end 105 directly under the windows 111 is provided with a pair of doors 113 which are suitably hinged at 114 and provided with suitable latches 115 adapted to hold the doors in closed position. The front end is further provided with suitable head lights 116 so located as not to interfere with the swinging action of the doors as can clearly be seen in Figure 10.

The rear end 106 is provided with a pair of doors 117 which as shown in Figure 11, are of a length to extend from the floor 107 substantially to the base of the roof 108 and the doors are suitably hinged to the body at 118 and provided with suitable latches or catches 119 to hold the doors in closed position. As shown in Figure 11 each door 117 may be provided with a window 120 for further admitting light to the interior of the body. The front and rear ends 105 and 106 respectively are each provided with a suitable bumper 121 each of which is provided with a detachable or hinged section 122 to facilitate the opening of the doors.

The body 103 is provided with the motors 35 and 36, brakes 40, differentials 41, drive shafts 46 and 49, and other power transmitting mechanism above described in detail and as particularly illustrated in Figures 3 and 4.

As can be seen from Figures 1 and 4, the stub axles 17 and 18 of the rear wheels 33 and 34 are disposed considerably below the centers of said rear wheels and the front axles are similarly disposed. This arrangement makes it possible to place the floor 107 very low without interference from the axles or as shown in Figure 9, the wheels 33, 34, 67 and 68, motors 35 and 36, shafts 46 and 49, and springs 19 and 22 and allied parts project above the floor line but adjacent the sides of the body. It will be noted by reference to Figures 2 and 3 that the parts projecting above the floor line are practically aligned with the wheels and occupy a relatively small portion of the transverse width of the body and accordingly the floor 107 will extend the full length of the body but is of course narrower between said projecting parts than at the ends of the body.

It is, however, within the scope of my invention to utilize the otherwise wasted space occupied by said upwardly projecting parts of the power and power transmitting mechanism by housing the said parts as indicated at 123 in Figure 9 which housings provide suitable ledges or tables upon which merchandise may be placed for transportation or upon which mail or packages may be conveniently and expeditiously sorted.

If desired the housings may be extended to cover the front springs, thus providing a bench on each side practically the full length of the body or the front springs may be separately housed providing separate benches or merchandise storing ledges. The front and rear wheels are partially surrounded by suitable guards or protectors 124 which function as the well known fenders and a suitable driver's seat 125 is provided adjacent the steering wheel 126 and a door 127 is provided for access by the driver.

It will accordingly be seen that a road vehicle for the transportation of merchandise is provided in which the body is of maximum internal dimensions and accordingly of maximum load carrying capacity and in which the power generating and power transmitting means are suitably housed without substantially interfering with the load carrying capacity of the body.

By providing the body 103 with front doors 113 and rear doors 117 the vehicle can be loaded or unloaded at either or both ends thus providing a body that can be loaded or unloaded conveniently and expeditiously. Also by arranging the floor 107 very low and in line with the bottom of the doors there is provided a low center of gravity permitting safe high speed operation of the vehicle, and heavy pieces of merchandise can easily be introduced into the body by tilting such pieces about the low floor edge and by pushing them uninterruptedly along the floor thereof with a minimum of physical exertion. Smaller and lighter pieces of merchandise can be placed on the shelves provided by the housings 123.

Also by providing the body with both front and rear doors when extraordinarily long pieces are being transported it is possible to allow one or both ends thereof to project beyond the ends of the body with the doors in open position.

It will be appreciated that in accordance with the invention hereinbefore set forth a construction is provided for automotive vehicles whereby a separate and independent power and driving mechanism is provided for the driving wheels on each side of the vehicle and which is so mounted relative to the body of the vehicle that the carrying capacity of the vehicle is in no way interfered with and also that the vehicle body is maintained in a better balanced condition than in vehicles commonly used.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What I claim and desire to secure by United States Letters Patent is:—

1. In combination with the body of an automotive road vehicle, steering wheels and tandem drive wheels associated with the body, springs mounted to support said body upon said wheels, a power unit supported within the body adjacent each side thereof and intermediate the end thereof, and power transmitting means connecting with the power unit and tandem drive wheels adjacent each side of the body and supported within but adjacent the sides thereof.

2. An automotive vehicle comprising a body, a pair of axles resiliently supported from the body, independently operable wheels supporting the axles, power generating and transmitting means for the wheels at each side of the body, and supported thereby and means to connect each of said power generating and transmitting means to the wheels on the same side of the vehicle.

3. An automotive vehicle comprising a body, a pair of axles resiliently supported from the body, gear housings carried by the ends of the axles, gears mounted within the housings, shafts associated with the gears, drive wheels carried by the shafts, the wheels on the same axle being independently operable, power units supported by the body, drive shafts connected with the power units and extending into said housings, and gears carried by said shafts adapted to mesh with said first gears to thus impart rotation to the drive wheels.

4. An automotive vehicle comprising a body, a pair of axles resiliently supported from the body, gear housings supported by the ends of the axles, shafts journalled within the housings, gears secured to the shafts within the housings, drive wheels carried by the shafts, a power unit supported by the body at each side thereof, a differential associated with each power unit, power transmitting shafts extending from each differential to the gear housings at corresponding sides of the vehicle, and gears carried by said shafts adapted to mesh with said first gears to impart rotation to said drive wheels.

5. In an automotive vehicle comprising a body, a pair of resiliently supported axles, a gear housing carried by each end of each axle, a shaft journaled in each housing, a drive wheel detachably supported on each shaft, a gear carried by each shaft, a power unit on each side of the body, a differential associated with each power unit, a pair of oppositely rotated drive shafts associated with each differential, one drive shaft on each side of the body adapted to drive the gear supported by one axle from the upper side thereof and the other drive shafts adapted to drive the gears supported by the other axle from the lower side thereof whereby the drive wheels are all driven in the same direction.

6. In an automotive vehicle, a body, a power unit supported on each side of the body, a frame supported differential on each side of the body, a transmission and propeller shaft brake between each power unit and differential, a pair of independently operable drive wheels on each side of the body, and a drive shaft associated with each drive wheel and connected to and driven by said differential on the same side of the body.

7. In an automotive vehicle, a body, a power unit supported at each side of the body, a differential supported on each side of the body, driving means between the power units and differentials, a pair of axles resiliently supported from the body, a housing carried by each end of each axle, a shaft journaled in each housing, a gear wheel fixed on each shaft, a drive wheel carried by each shaft, the housings carried by one axle supporting worms at the lower sides thereof in mesh with the gear wheels, the housings carried by the other axle supporting worms at the upper sides thereof in mesh with the gear wheels and being each provided with a bearing at the upper side thereof, a pair of flexible drive shafts associated with each differential, one drive shaft adapted to impart rotation to the lower worm and the other drive shaft extending through one of said bearings and adapted to impart rotation to the upper worm, whereby each differential is independently associated with the drive wheels on each respective side of the body.

8. In an automotive vehicle, a body, a power unit supported on each side of the body, a pair of axles resiliently supported from the body, a gear housing supported on both ends of each axle, a shaft journaled in each housing, a hypoid gear fixed on each shaft, a drive wheel carried by each shaft, a differential supported on each side of the body, power transmitting means between each power unit and the respective differential, a pair of drive shafts extending from each differential, one drive shaft having its opposite end journaled in one of the housings on the respective side of the body and the other drive shaft extending through the first housing and having its opposite end journaled in the other housing on the respective side of the body, and pinions carried by said shafts adapted to mesh with and impart rotation to said hypoid gears.

9. An automotive vehicle comprising a body, a pair of axles resiliently supported from the body, each axle supporting a gear housing on each end thereof, a shaft journaled in each housing, a hypoid gear fixed on each shaft, a drive wheel carried by each shaft, the housings supported by one axle each provided with two pairs of bearings, one pair being arranged vertically above the other pair, the housings supported by the other axle each provided with a pair of bearings in alinement with the upper bearings in the first housings, a power unit on each side of the body, a differential supported on each side of the body in driving connection with the respective power unit, a pair of flexible drive shafts extending from each differential, one drive shaft of each differential having its opposite end journaled in said lower bearings and the other drive shaft of each differential extending through said first housing and journaled in the upper pair of bearings and having its opposite end journaled in the bearings of said second housing, and pinions carried by said drive shafts adapted to mesh with and impart rotation to said hypoid gears.

10. A road vehicle comprising an elongated body, a plurality of axles adjacent the rear end of said body, springs to resiliently connect the axles to the body, a pair of wheels to support each axle, the wheels on the same axle being independently mounted, a power unit supported by said body at each side of the vehicle, a plurality of shafts at each side of the vehicle differentially driven by the power unit at the same side of the vehicle, each of said shafts being operatively connected separately to a wheel on the same side of the vehicle.

11. The combination defined in claim 10 in which said shafts extend substantially horizontally, and are provided with gears that drive said wheels, the gears being arranged between the horizontal plane that contains the axes of rotation of the wheels on the same side of the vehicle, and a horizontal plane tangent to the wheel driving gears.

12. A tandem axle road vehicle comprising parallel axles arranged to support one end of said vehicle, springs interconnecting said axles and said vehicle, ground engaging wheels supporting said axles, a torque resisting connection extending between said axles, said connection being pivotally attached at its ends to the axles for pivotal movement about a vertical axes arranged at the far side of said axles, said connection being extensible endwise, and comprising elements between which rotation may take place about an axes extending endwise of the connection.

13. An automotive vehicle comprising a body, axles, wheels carried by said axles and arranged beneath and housed in recesses in the sides of said body, a motor housed by said body adjacent each side thereof in approximate endwise alinement with the wheels on the same side of said body, drive shafts interconnecting said motors and certain of said wheels at the same side of said body, an uninterrupted floor extending within said body from end to end between said motors, and openings in said body to permit loading thereof from both ends of said body.

14. An automotive vehicle comprising a body, axles, wheels carried by said axles and arranged beneath and housed in recesses in the sides of said body, said axles being offset substantially below the center of rotation of said wheels, a motor housed by said body adjacent each side thereof in approximate endwise alinement with the wheels on the same side of said body, drive shafts interconnecting said motors and certain of said wheels at the same side of said body, an uninterrupted floor extending within said body from end to end between said motors and disposed close to said offset axles, wheel recesses in said body and an opening in an end of said body.

15. In an automotive vehicle, a pair of axles arranged to support one end of the vehicle, blocks non-rotatably secured to each axle, each block providing plane surfaces extending transverse to the axis of the axle to which it is secured; a bifurcated member pivoted to each of said blocks for swinging movement about a vertical axis disposed remote from the other axle, the arms of said bifurcations snugly embracing said plane surfaces, and means interconnecting the bifurcated members of adjacent axles, said means permitting the axles to move toward and from each other and being disposed so that the axles can tilt freely in planes transverse to the length of the vehicle.

16. A tandem axle road vehicle, comprising tubular parallel axles arranged to support one end of said vehicle, springs interconnecting said axles and the frame of said vehicle, ground engaging wheels supporting said axles; blocks having plane surfaces non-rotatably secured to said axles, torque resisting connections between said axles comprising bifurcated members pivoted to said blocks for swinging movement about vertical axes and snugly embracing said plane surfaces, the bifurcated members of the adjacent axles being interconnected by means including a cylindrical rod extensibly mounted in a tubular socket, whereby the axles are free to move toward and from each other and to tilt in planes transverse to the length of the vehicle frame.

In testimony whereof I affix my signature.

ROLLIE B. FAGEOL.